United States Patent
Bivens et al.

(10) Patent No.: US 10,977,085 B2
(45) Date of Patent: Apr. 13, 2021

(54) OPTIMIZING DYNAMICAL RESOURCE ALLOCATIONS IN DISAGGREGATED DATA CENTERS

(71) Applicant: INTERNATIONAL BUSINESS MACHINES CORPORATION, Armonk, NY (US)

(72) Inventors: John A. Bivens, Ossining, NY (US); Min Li, San Jose, CA (US); Ruchi Mahindru, Elmsford, NY (US); Valentina Salapura, Chappaqua, NY (US); Eugen Schenfeld, South Brunswick, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 50 days.

(21) Appl. No.: 15/982,572

(22) Filed: May 17, 2018

(65) Prior Publication Data
US 2019/0354412 A1    Nov. 21, 2019

(51) Int. Cl.
*G06F 9/50* (2006.01)
*G06F 9/48* (2006.01)
(Continued)

(52) U.S. Cl.
CPC .............. *G06F 9/5033* (2013.01); *G06F 9/48* (2013.01); *G06F 9/4806* (2013.01);
(Continued)

(58) Field of Classification Search
CPC ........ G06F 9/48; G06F 9/4806; G06F 9/4843; G06F 9/4881; G06F 9/5005;
(Continued)

(56) References Cited

U.S. PATENT DOCUMENTS

| | | | |
|---|---|---|---|
| 6,058,414 A | 5/2000 | Manikundalam et al. | |
| 7,685,281 B1 | 3/2010 | Saraiya et al. | |

(Continued)

FOREIGN PATENT DOCUMENTS

EP    2669798 A1    12/2013

OTHER PUBLICATIONS

List of IBM Patents or Patent Applications Treated as Related dated Jun. 1, 2018 (2 pages).
(Continued)

*Primary Examiner* — Charles M Swift
(74) *Attorney, Agent, or Firm* — Griffiths & Seaton PLLC

(57) ABSTRACT

Embodiments for optimizing dynamic resource allocations in a disaggregated computing environment. Data access patterns of data elements associated with a set of workloads are tracked across predetermined windows of time. The set of workloads is categorized into at least one of a plurality of classes, each class characterized by a method of data access of the data elements during the tracking of the data access patterns. Resource allocations are optimized in the disaggregated computing environment for a current iteration of the set of workloads based on the method of data access by allocating specific resources within the disaggregated data center to the current iteration of the set of workloads according to the data access patterns in real-time.

21 Claims, 11 Drawing Sheets

(51) Int. Cl.
*G06F 12/0862* (2016.01)
*G06F 11/34* (2006.01)
*H04L 12/24* (2006.01)

(52) U.S. Cl.
CPC .......... *G06F 9/4843* (2013.01); *G06F 9/4881* (2013.01); *G06F 9/50* (2013.01); *G06F 9/505* (2013.01); *G06F 9/5005* (2013.01); *G06F 9/5061* (2013.01); *G06F 9/5072* (2013.01); *G06F 9/5077* (2013.01); *G06F 11/3414* (2013.01); *G06F 12/0862* (2013.01); *G06F 2212/6026* (2013.01); *H04L 41/5096* (2013.01)

(58) Field of Classification Search
CPC ........ G06F 9/5061; G06F 9/5072; G06F 9/50; G06F 9/5033; G06F 9/5077
See application file for complete search history.

(56) References Cited

U.S. PATENT DOCUMENTS

| | | | |
|---|---|---|---|
| 8,521,961 | B2 | 8/2013 | Eichenberger et al. |
| 8,539,491 | B1 | 9/2013 | Small et al. |
| 9,262,225 | B2 | 2/2016 | Davis et al. |
| 9,542,231 | B2 | 1/2017 | Khan et al. |
| 10,025,627 | B2 * | 7/2018 | Ferris ........................ G06F 9/50 |
| 10,057,184 | B1 | 8/2018 | Prahlad et al. |
| 10,069,749 | B1 | 9/2018 | Narkier et al. |
| 10,127,085 | B2 | 11/2018 | Li et al. |
| 2005/0268038 | A1 | 12/2005 | Yasue |
| 2006/0080365 | A1 | 4/2006 | Glover et al. |
| 2007/0083728 | A1 | 4/2007 | Nijhawan et al. |
| 2007/0156771 | A1 | 7/2007 | Hurley et al. |
| 2007/0250604 | A1 | 10/2007 | Wu |
| 2007/0271570 | A1 | 11/2007 | Brown et al. |
| 2008/0271038 | A1 | 10/2008 | Rolia et al. |
| 2008/0282252 | A1 | 11/2008 | Prasanna et al. |
| 2009/0182836 | A1 * | 7/2009 | Aviles ................. H04L 41/0893 709/213 |
| 2010/0011365 | A1 | 1/2010 | Gerovac et al. |
| 2010/0036903 | A1 | 2/2010 | Ahmad et al. |
| 2010/0042762 | A1 | 2/2010 | Pothireddy et al. |
| 2010/0306379 | A1 * | 12/2010 | Ferris ................. H04L 41/5006 709/226 |
| 2012/0259977 | A1 | 10/2012 | Gerovac et al. |
| 2013/0238851 | A1 | 9/2013 | Chang et al. |
| 2014/0173211 | A1 * | 6/2014 | Loh ..................... G06F 12/0842 711/129 |
| 2014/0181833 | A1 | 6/2014 | Bird et al. |
| 2014/0281352 | A1 * | 9/2014 | Venkatsubramanian .................... G06F 12/1027 711/205 |
| 2014/0289376 | A1 * | 9/2014 | Chan ........................ H04L 69/04 709/219 |
| 2015/0160977 | A1 | 6/2015 | Accapadia et al. |
| 2015/0169369 | A1 * | 6/2015 | Baskaran .............. G06F 9/4881 718/102 |
| 2015/0309827 | A1 * | 10/2015 | Sarkar ................. G06F 9/45558 718/1 |
| 2015/0346800 | A1 | 12/2015 | Kumar |
| 2015/0381426 | A1 | 12/2015 | Roese et al. |
| 2016/0021177 | A1 | 1/2016 | Kobayashi et al. |
| 2016/0055082 | A1 | 2/2016 | Kim et al. |
| 2016/0124872 | A1 | 5/2016 | Shrader et al. |
| 2016/0246652 | A1 | 8/2016 | Herdrich et al. |
| 2016/0269228 | A1 | 9/2016 | Franke et al. |
| 2016/0292011 | A1 | 10/2016 | Colson et al. |
| 2016/0378545 | A1 | 12/2016 | Ho |
| 2016/0380921 | A1 | 12/2016 | Blagodurov |
| 2017/0149880 | A1 | 5/2017 | Lochhead et al. |
| 2017/0242729 | A1 | 8/2017 | Chen et al. |
| 2017/0331763 | A1 * | 11/2017 | Li ......................... H04L 47/803 |
| 2018/0024932 | A1 | 1/2018 | Nachimuthu et al. |
| 2018/0027058 | A1 | 1/2018 | Balle et al. |
| 2018/0046561 | A1 | 2/2018 | Enright |
| 2018/0129443 | A1 * | 5/2018 | Karve ................... G06F 3/0683 |
| 2018/0210531 | A1 | 7/2018 | Shahneous et al. |
| 2018/0365072 | A1 | 12/2018 | Li et al. |
| 2019/0034237 | A1 | 1/2019 | Siddappa et al. |
| 2019/0065281 | A1 | 2/2019 | Bernat et al. |
| 2019/0101974 | A1 | 4/2019 | Guim Bernat |
| 2019/0138358 | A1 | 5/2019 | Matsubara et al. |
| 2019/0163371 | A1 * | 5/2019 | Nambiar ................. G06F 3/065 |
| 2019/0205173 | A1 | 7/2019 | Gupta et al. |
| 2019/0220319 | A1 * | 7/2019 | Parees ................... G06F 9/4881 |

OTHER PUBLICATIONS

Anonymous, "Recovery of core in case of persistent cache error," An IP.com Prior Art Database Technical Disclosure, IP.com No. IPCOM000240409D, Jan. 29, 2015 (4 pages).

Anonymous, "A System and Method for Smart Workload Management on Asymmetric Multicore Architectures," An IP.com Prior Art Database Technical Disclosure, IP.com No. IPCOM000236928D, May 22, 2014 (7 pages).

Anonymous, "Dynamic Cache Reservation for Virtual Machine Applications in Cloud," An IP.com Prior Art Database Technical Disclosure, IP.com No. IPCOM000233167D, Nov. 28, 2013 (7 pages.).

IBM, "An efficient method to allocate resources to a virtual machine," An IP.com Prior Art Database Technical Disclosure, Ip.com No. IPCOM000184441D, Jun. 25, 2009 (5 pages).

Yang et al., "GReM: Dynamic SSD Resource Allocation in Virtualized Storage Systems With Heterogeneous IO Workloads," IEEE, 2016 (8 pages).

Juedes et al., "Heuristic Resource Allocation Algorithms for Maximizing Allowable Workload in Dynamic, Distributed Real-Time Systems," Proceedings of the 18th International Parallel and Distributed Processing Symposium (IPDPS'04), 2004 (8 pages).

Anonymous, "Method and system for dynamic management of cache eviction in multi tenant environments," An IP.com Prior Art Database Technical Disclosure, IP.com No. IPCOM000239143D, Oct. 16, 2014 (4 pages).

Anonymous, "Dynamic prefetched adjustment interface," An IP.com Prior Art Database Technical Disclosure, IP.com No. IPCOM000233783D, Dec. 19, 2013 (4 pages).

Koutras et al., "Improving Dynamic Memory Allocation on Many-Core Embedded Systems with Distributed Shared Memory," IEEE Embedded Systems Letters, vol. 8, No. 3, Sep. 2016 (4 pages).

Anonymous, "Method and system for optimal workload placement in a virtualized IT environment based on neural networks #gtscomp15," An IP.com Prior Art Database Technical Disclosure, IP.com No. IPCOM000246832D, Jul. 5, 2016 (6 pages).

Anonymous, "A Method for Computer Systems to Self Optimize Resource Allocations by Smoothing Historical Samples Over Time," An IP.com Prior Art Database Technical Disclosure, IP.com No. IPCOM000225567D, Feb. 18, 2013 (3 pages).

Anonymous, "Resource Usage Conflict Management Orchestrator," An IP.com Prior Art Database Technical Disclosure, IP.com No. IPCOM000225239D, Feb. 1, 2013 (5 pages).

Anonymous, "Automatic resource allocation based on an adaptive application profile environment to optimize computing resources," An IP.com Prior Art Database Technical Disclosure, IP.com No. PCOM000208686D, Jul. 15, 2011 (4 pages).

* cited by examiner

OPTIMIZING DYNAMICAL RESOURCE ALLOCATIONS IN DISAGGREGATED DATA CENTERS

CROSS-REFERENCE TO RELATED APPLICATIONS

This Application is related to the following six Applications having U.S. application Ser. Nos. 15/982,579, 15/982,586, 15/982,589, 15/982,604, 15/982,612 and 15/982,618, each filed on even date as the present Application.

BACKGROUND OF THE INVENTION

Field of the Invention

The present invention relates generally to large scale computing, and more particularly, to optimizing a distribution of hardware resources to associated workloads for enhanced computing efficiency.

Description of the Related Art

A popular type of large scale computing is cloud computing, in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Cloud computing may be provided as a service over the Internet, such as in the form of "Infrastructure as a Service" (IaaS), "Platform as a Service" (PaaS), and/or "Software as a Service" (SaaS). IaaS may typically provide physical or virtual computing devices and/or accessories on a fee-for-service basis and onto which clients/users may load and/or install, and manage, platforms, applications, and/or data. PaaS may deliver a computing platform and solution stack as a service, such as, for example, a software development platform, application services, such as team collaboration, web service integration, database integration, and/or developer community facilitation. SaaS may deploy software licensing as an application to customers for use as a service on demand. SaaS software vendors may host the application on their own clouds or download such applications from clouds to cloud clients, disabling the applications after use or after an on-demand contract expires.

The provision of such services allows a user access to as much in the way of computing resources as the user may need without purchasing and/or maintaining the infrastructure, such as hardware and/or software, that would be required to provide the services. For example, a user may instead obtain access via subscription, purchase, and/or otherwise securing access. Thus, cloud computing may be a cost effective way to deliver information technology services. However, cloud computing may also be hindered by issues of resource configuration and allocation aspects, and hence, there is a fundamental need to enhance and improve upon the structures and systems supporting these services.

SUMMARY OF THE INVENTION

Various embodiments optimizing dynamic resource allocations in a disaggregated computing environment, by a processor device, are provided. In one embodiment, a method comprises (a) tracking data access patterns of data elements across predetermined windows of time, the data elements associated with a set of workloads; (b) categorizing the set of workloads into at least one of a plurality of classes, each class characterized by a method of data access of the data elements during the tracking of the data access patterns; and (c) optimizing resource allocations in the disaggregated computing environment for a current iteration of the set of workloads based on the method of data access by allocating specific resources within the disaggregated data center to the current iteration of the set of workloads according to the data access patterns in real-time.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
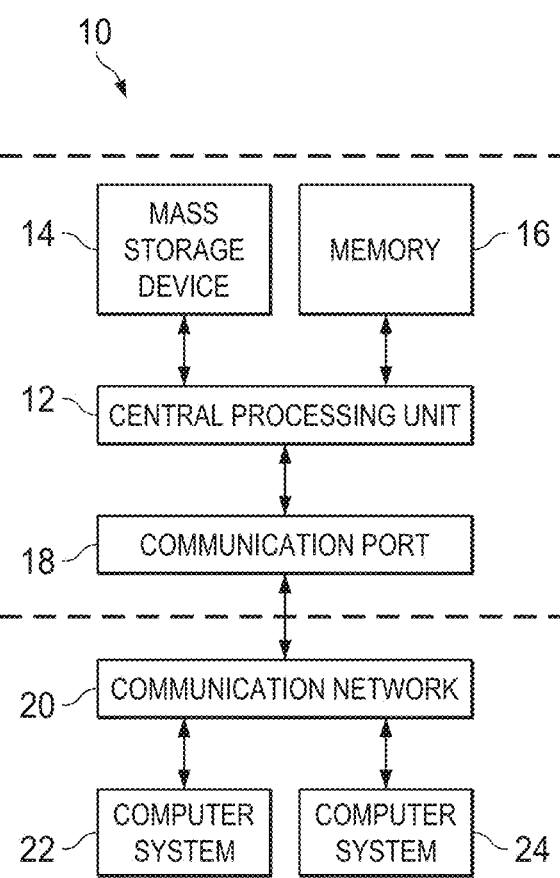
FIG. 1 is a block diagram depicting a hardware structure of a computing system, in which aspects of the present invention may be realized.

The techniques of this disclosure preferably are implemented within the context of a "disaggregated" computing system wherein a "disaggregated server"—sometimes referred to herein as a "server entity"—is dynamically constructed/composed or constitutes server resources selected from (or assigned from) shared server resource pools, namely, one or more of: a compute pool, a memory pool, an accelerator pool (e.g., a GPU accelerator, a network accelerator, etc.), and a storage pool. As the nomenclature suggests, a "compute" pool typically constitutes physical processors (such as CPUs), a "memory" pool typically constitutes physical memory devices (such as dual-inline-memory modules (DIMM)), etc. A given shared pool preferably includes just the particular resource types, but a particular resource pool may be composed of one or more resource sub-types. The notion of a "pool" is not intended to be limiting, as the common resources may be collected, aggregated or otherwise combined in any suitable manner. Further, a "pool" may be a dedicated set of resources that have the common type or sub-type, or some ad hoc collection of such resources. Preferably, a particular server entity comprises server resources from one or more of the server resource pools.

Disaggregated computing systems provide flexibility and elasticity in constructing bare-metal computing systems for use in the cloud, to provide on-demand flexibility to cloud users, or "tenants". As mentioned, a disaggregated computing system is referred to as a system with large pools of physical hardware resources, such as CPUs, accelerators, memory devices, and storage devices, whose connectivity with each other individual hardware resource can be dynamically switched without shutting down any hardware nor running applications. Individual hardware resources from these pools can be selected to assemble computer systems on-demand. Thus, a bare-metal computer system with a flexible capacity of individual computing resources may be assembled in a disaggregated system, such that workloads are computed based on hardware resource configurations that are most suitable for the respective workload. In one embodiment, for example, a system may be constructed with an extremely high capability of memory size but with a more moderate capacity of CPU and other resources, for a memory-intensive workload. This functionality is enabled by the use of point-to-point circuit wire level switching. All disaggregated system proposals currently known in the art are copy-based systems in which a process state is copied over a memory fabric to local memory at the computation hardware because of the latency in connecting directly to the pool over the memory fabric or over a symmetric multiprocessing (SMP) system. This means that switching between computing components cannot happen in milliseconds as can the point-to-point circuit wire level switching mechanisms used in the present invention thereby enabling a continuous, instantaneous execution of processes even while the computing components are switched.

One advantageous component of disaggregated computing systems is the opportunity to perform computation between various hardware resources in ways previously unattainable. For example, in most pre-configured computing systems, pre-fetching techniques and data locality help to keep cache hit rates high, enabling ultra-fast performance for the end user. However, if the processor spends a vast amount of time finding the needed data in the cache, it may be under-utilizing bandwidth to main memory. Since the disaggregated architecture permits additional processing components to be connected to various memory pool modules, a method to better utilize this bandwidth to memory modules is proposed by efficiently connecting to the memory modules from other processing components (during times of low usage) to perform analytic functions which may lead to valuable insights about the data, or its processing. Such memory access will not pass through the usual SMP fabric connecting processors, and hence does not disturb inter-processor communication and coherency when really needed, increasing efficiency further.

In another example, and in the context of the present invention, the architecture of disaggregated computing systems may be leveraged to dynamically construct a server entity of various physical resources according to the physical locality of the data and the underlying resources needed to complete workloads utilizing this data. Consider that typical resource allocation mechanisms would attempt, for a single computer system, to allocate resources that are physically close to one another to reduce system latency. However, depending on a workload's data access patterns executed by this computer system, these allocations (even as they may be physically close together) may have little or no effect on performance and could lead to fragmented and non-optimal results for the larger disaggregated framework (as the actual locality of the underlying data may be different than the locality of the resources performing the workload). Accordingly, considered is a mechanism for continual resource allocation optimization which leverages observed system behavior (e.g., data access patterns) and the unique, resource allocation capabilities of the disaggregated system to dynamically re-align compute resources to data in a way not possible in traditional systems. This re-alignment of system resources will serve to strike a better balance between the overall disaggregated framework utilization and the performance of each dynamic hardware system.

It should be noted that the instant disclosure, for brevity, frequents the language of "resources". In an actual implementation of the present invention, the resources termed herein may be comprised of CPUs, graphical processing units (GPUs), memory, storage devices, network devices, accelerator devices, etc. which are, again, generally pooled together in a shared resource pool fashion. Indeed, any hardware and/or software resources as commonly known in the art are to be construed interchangeably with "resources" or "resource types" as described herein, as one practicing the art would appreciate.

Typically, the shared resource pools are available within the physical confines of a particular data center, although this likewise is not a limitation. Thus, the shared resource pools themselves may be shared across physical data centers. Further, a particular server entity is not required to be composed of resources from each of the server pools.

By way of background, but not by way of limitation, the following describes a representative computer environment in which the techniques of this disclosure (described below) may be practiced.

Turning now to FIG. 1, exemplary architecture 10 of a general computing environment in which the disaggregated compute system of this disclosure may be implemented and/or comprised of is depicted. The computer system 10 (which may also be referred to as "cloud computing node" 10) includes CPU 12, which is connected to communication port 18 and memory device 16. The communication port 18 is in communication with a communication network 20. The communication network 20 and storage network may be configured to be in communication with computer systems (hosts) 24 and 22 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer systems 24 and 22. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

It is further understood in advance that although this disclosure includes a detailed description on cloud computing, following, that implementation of the teachings recited herein are not limited to a cloud computing environment. Rather, embodiments of the present invention are capable of being implemented in conjunction with any other type of computing environment now known or later developed.

As previously eluded to, cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes and storage systems (e.g. storage subsystem 20).

Figure 2:
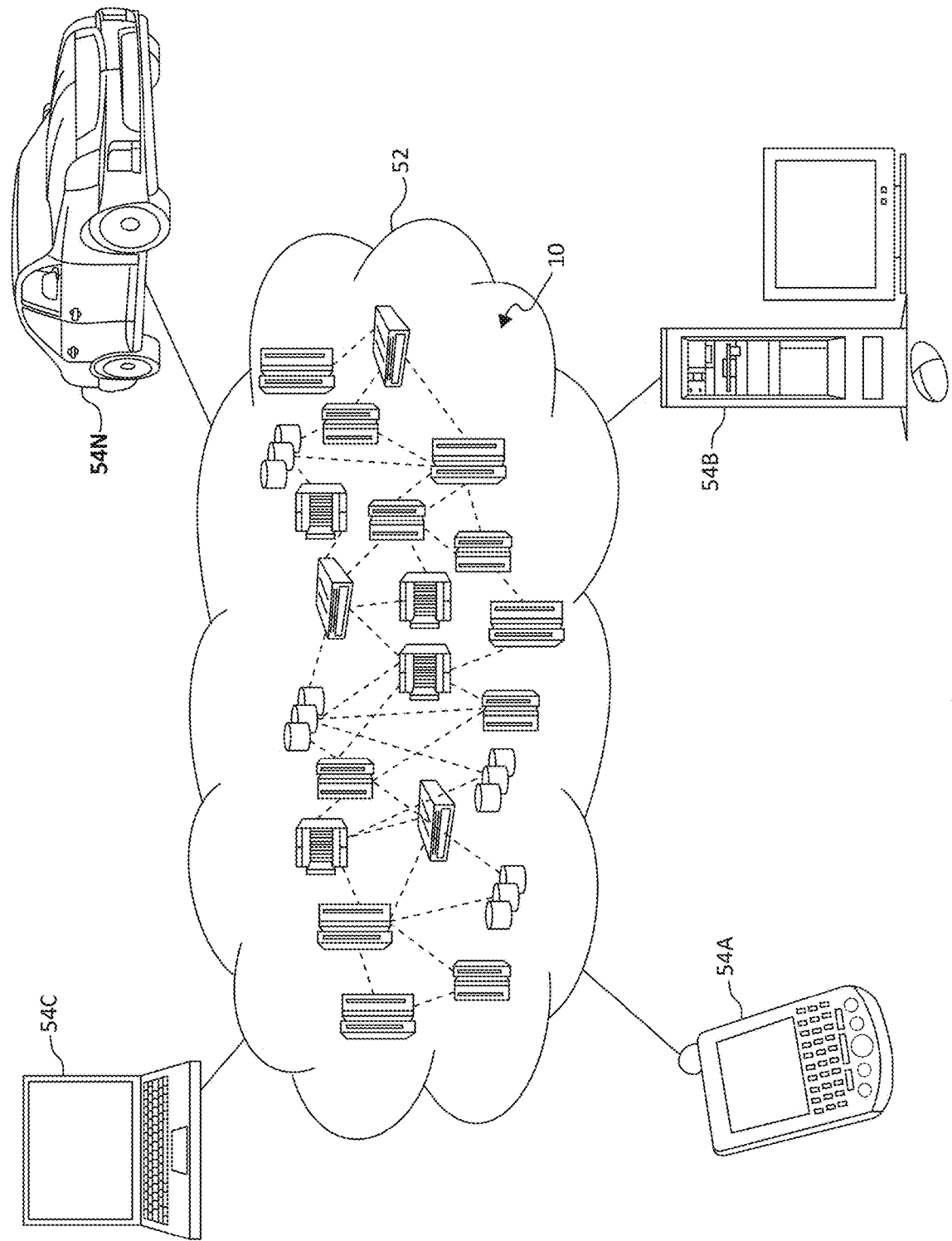
FIG. 2 is a block diagram of an exemplary cloud computing environment according to embodiments of the present invention.

Referring now to FIG. 2, illustrative cloud computing environment 52 is depicted. As shown, cloud computing environment 52 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 52 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 52 can communicate with any type of computerized device over any type of network and/or network addressable connection (e.g., using a web browser).

Figure 3:
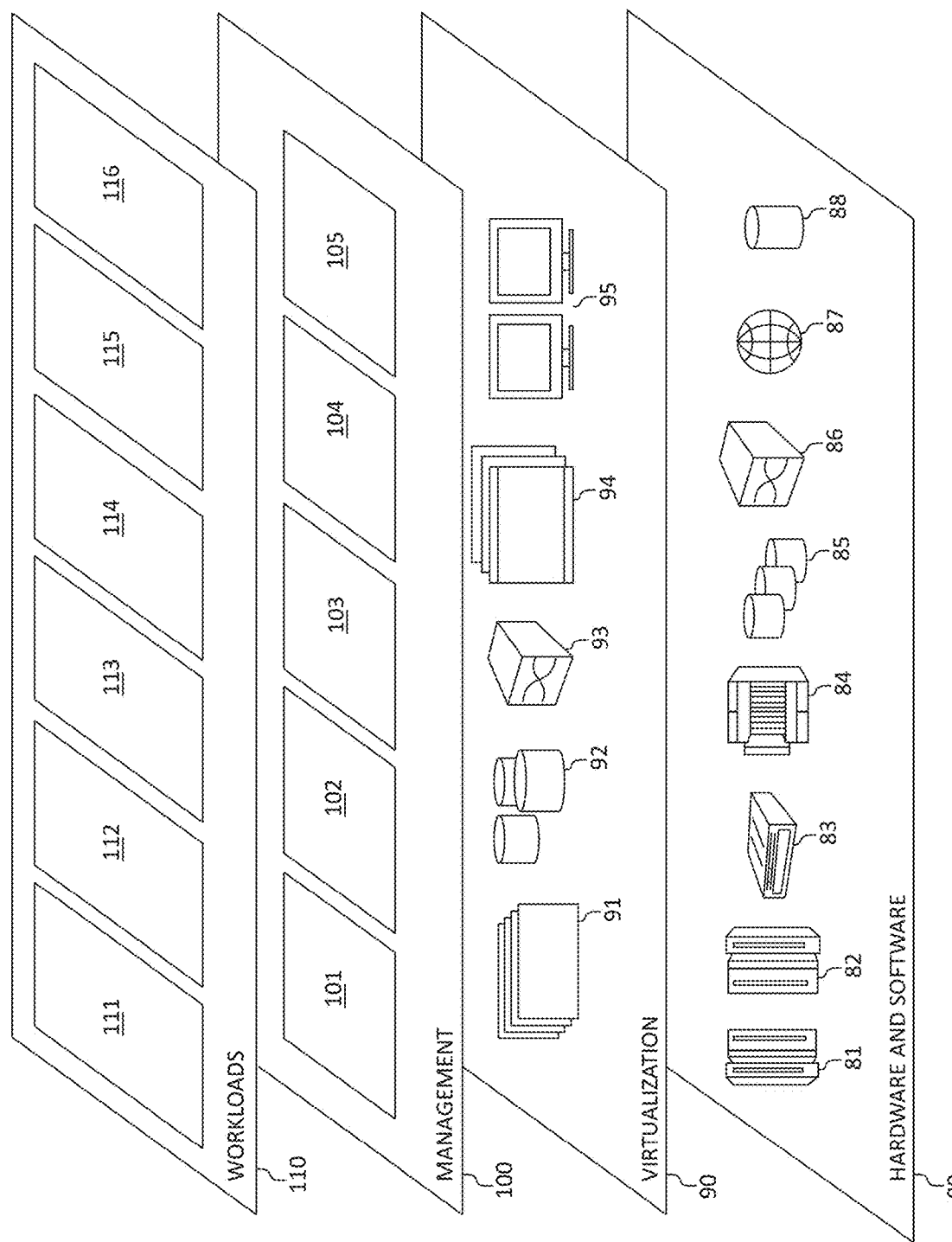
FIG. 3 is a block diagram depicting abstraction model layers according to embodiments of the present invention.

Referring now to FIG. 3, a set of functional abstraction layers provided by cloud computing environment 52 (FIG. 3) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 80 includes hardware and software components. Examples of hardware components include: mainframes 81; RISC (Reduced Instruction Set Computer) architecture based servers 82; servers 83; blade servers 84; storage devices 85; and networks and networking components 86. In some embodiments, software components include network application server software 87 and database software 88.

Virtualization layer 90 provides an abstraction layer from which the following examples of virtual entities may be provided: virtual servers 91; virtual storage 92; virtual networks 93, including virtual private networks; virtual applications and operating systems 94; and virtual clients 95.

In one example, management layer 100 may provide the functions described below. Resource provisioning 101 provides dynamic procurement of computing resources and other resources that are utilized to perform tasks within the cloud computing environment. Metering and Pricing 102 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 103 provides access to the cloud computing environment for consumers and system administrators. Service level management 104 provides cloud computing resource allocation and management such that required service levels are met. Service Level Agreement (SLA) planning and fulfillment 105 provides pre-arrangement for, and procurement of, cloud computing resources for which a future requirement is anticipated in accordance with an SLA.

Workloads layer 110 provides examples of functionality for which the cloud computing environment may be utilized. Examples of workloads and functions which may be provided from this layer include: mapping and navigation 111; software development and lifecycle management 112; virtual classroom education delivery 113; data analytics processing 114; transaction processing 115; and, in the context of the illustrated embodiments of the present invention, various resource monitoring and allocation functionality 116. One of ordinary skill in the art will appreciate that the resource monitoring and allocation functionality 116 may also work in conjunction with other portions of the various abstractions layers, such as those in hardware and software 80, virtualization 90, management 100, and other workloads 110 (such as data analytics processing 114, for example) to accomplish the various purposes of the illustrated embodiments of the present invention.

Figure 4:
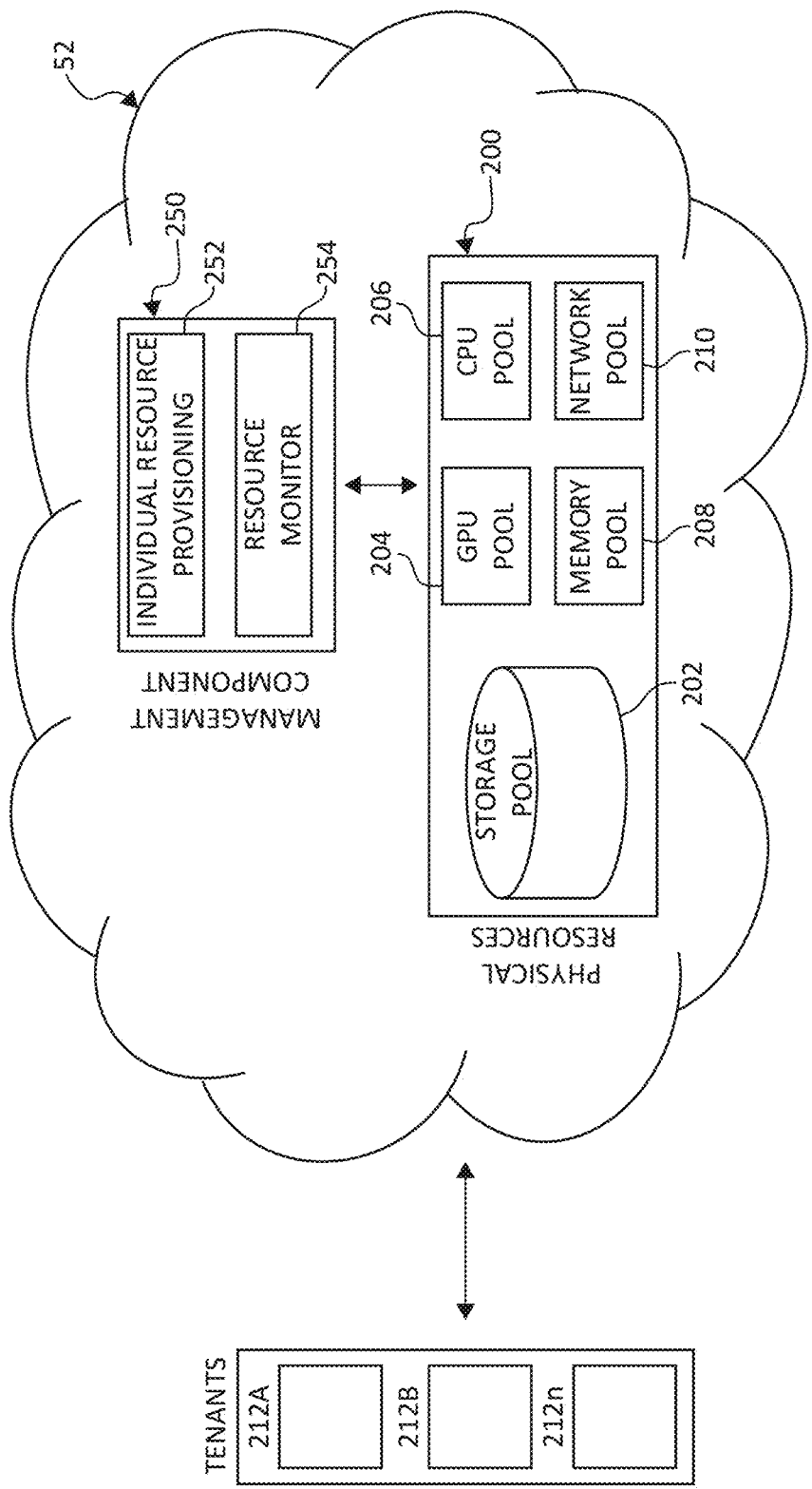
FIG. 4 is a block diagram depicting a hardware structure of a disaggregated computing environment, in which aspects of the present invention may be realized.

Turning now to FIG. 4, a block diagram of a disaggregated computing architecture is illustrated, of which is included in the cloud computing environment 52. Within cloud computing environment 52 is the disaggregated computing system comprising physical hardware resources 200. Physical hardware resources 200 may comprise of classifications of the hardware resources such as a storage device pool 202, a GPU device pool 204, a CPU device pool 206, a memory device pool 208, and a network device pool 210. The physical hardware resources 200 are in communication with a management module 250. Management module 250 may comprise of such components as an individual resource provisioning component 252 and a resource monitor 254, each described herein.

In communication with the cloud computing environment 52, the management module 250, and the physical hardware resources 200, are tenants 212A, 212B, and 212n. Tenants 212A, 212B, and 212n may communicate with the cloud computing environment 52 by way of the management module 250, and thus the physical resources 200 provided by any signal-bearing medium.

It should be noted that the elements illustrated in FIG. 2 provide only an example of related components that may be included in the disaggregated computing architecture. For example, management module 250 may include other components than individual resource provisioning component 252 and resource monitor 254, and physical hardware resources 200 may include other component classifications than storage device pool 202, GPU device pool 204, CPU device pool 206, and memory device pool 208, and network pool 210, while staying in the spirit and scope of the present invention. Additionally, the duties of the management module 250, and thus the components therein, may be performed and comprised of physical components, computer code, or a combination of such.

In one embodiment, the management module 250 interacts with individual tenants 212A-n to receive workload requests and locate the best suitable hardware resources for the given workload. Individual hardware resources of the physical hardware resources 200 are tracked and a mapping is maintained between each respective tenant 212A-n and respective assigned hardware resource. Each hardware resource is identified using a unique identifier. This identifier may be a physical identifier (e.g., barcode) and/or a virtual identifier (e.g., code based). The management module 250, or any other suitable modules or means known in the art may be used to accomplish these mechanisms.

Figure 5:
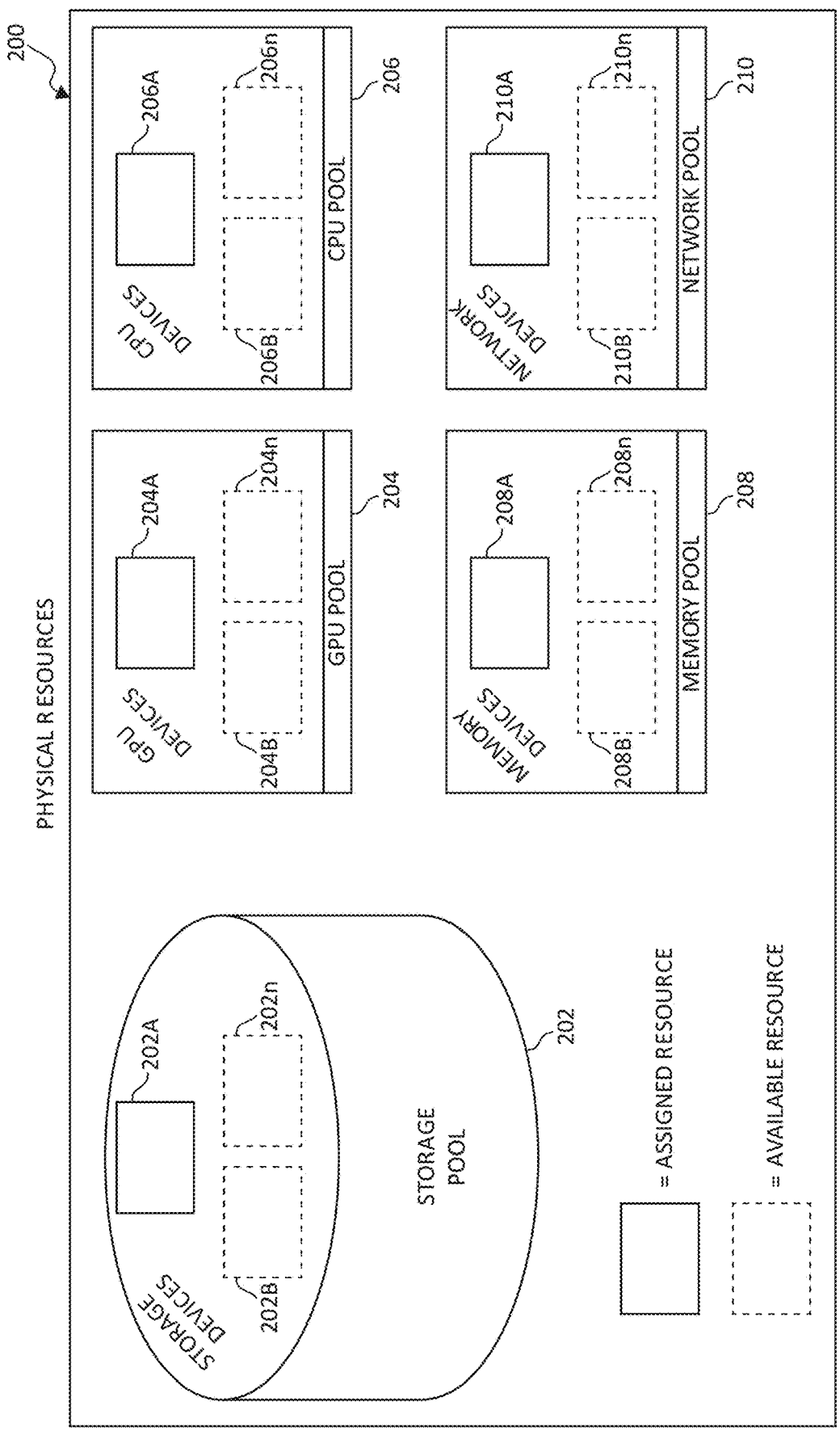
FIG. 5 is an additional block diagram depicting a hardware structure of a disaggregated computing environment, in which aspects of the present invention may be realized.

FIG. 5 is a block diagram illustrating the physical hardware resources 200 portion of FIG. 4. Included in the storage device pool 202 are storage devices 202A, 202B, and 202n. The GPU device pool 204 includes GPU devices 204A, 204B, and 204n. The CPU device pool 206 includes CPU devices 206A, 206B, and 206n. The memory device pool 208 includes memory devices 208A, 208B, and 208n. Finally, the network device pool 210 includes network devices 210A, 210B, and 210n. Each aforementioned hardware resource may be in communication with an additional one or more aforementioned hardware resources via a signal-bearing medium.

Within physical hardware resources 200, each hardware resource appearing in solid line (i.e., storage device 202A, GPU device 204A, CPU device 206A, memory device 208A, and network device 210A) are assigned hardware resources to one or more tenants (i.e., tenants 212A, 212B, 212n). Hardware resources appearing in dashed line (i.e., storage devices 202B, 202n, GPU devices 204B, 204n, CPU devices 206B, 206n, memory devices 208B, 208n, and network devices 210B, 210n) are unassigned hardware resources which are available on-demand for a respective tenant 212A-n workload.

Each respective tenant 212A-n may be assigned individual respective hardware resources 200 in arbitrary quantities. In one embodiment, each respective tenant 212A-n may be assigned an arbitrary quantity of an individual respective hardware resource 200 within a limit of total system capacity and/or an available quantity of the respective hardware resources 200. For example, a memory device 208A-n allocated from the memory pool to a respective tenant 212A-n may be provided in a minimal unit of allocation (e.g., a byte or word) up to a limit of total system capacity and/or an available quantity of the memory devices 208A-n.

In another embodiment, each respective tenant 212A-n may be assigned individual respective hardware resources 200 within a quantum step sizing restriction. For example, memory devices 208A-n may need to be allocated on quantum sizes of full or half of memory DIMM units, to assure full bandwidth from the respective memory device 208A-n to the processor when reading/writing data. This is especially true in a disaggregated system since the memory device 208A-n is directly connected via fiber/optical switch to the processor memory unit (for read/write memory transactions) as if it was locally connected to the processor chip, but rather may be a small distance (e.g., 1 meter) away in location. In another example, because the disaggregated system is not based on virtual components but rather physical components (i.e., actual chips than cores or VMs), the quantum sizing restriction may require that a minimum of one CPU device 206A-n be assigned to a tenant 212A-n, with additional CPU devices 206A-n being provisioned to the tenant 212A-n in two, four, etc. quantities.

Optimizing Dynamic Resource Allocations

In various embodiments, the functionality of the present invention leverages the point-to-point circuit wire level switching and hardware pooling attributes of disaggregated systems to provide an efficient mechanism for rolling software upgrades. As aforementioned, in this type of disaggregated system, like resources are organized into pools which can be directly connected to resources of another pool. An effectively provisioned "system" will be composed of a set of computing resources connected in a point-to-point fashion to memory and storage resources, etc.

Thus, in a disaggregated system, resources may be allocated to the composed system based on various observed data access patterns of workloads which would otherwise be unattainable using fixed-hardware mechanisms. This allows resources to be allocated, in substantially real-time, to specific workloads (or workload types) which may benefit from running on a specific resource or set of resources being in a specific physical locality in relation to one another. Further, this functionality aids in achieving an optimal balance between utilization of the disaggregated framework (which optimally is a high utilization such that resources are not left stagnant) and the performance of each dynamically constructed system in the disaggregated environment.

First, considered is a method of data access analysis which functions as a data heat map. The heat map tracks access patterns across windows of time on a data element basis, which data elements are associated with workloads performed by the disaggregated system. The disclosed functionality additionally provides techniques to reduce the overhead (if any) caused by creating and maintaining the data heat map. This helps to position the storage/memory hierarchy of the disaggregated framework as simply a range of mediums with different properties (e.g., speed and physical locality in relation to the processor) which could be exploited (i.e., combined with the inherent dynamic allocation/reallocation functionality of the disaggregated system) to drive the balance between the overall disaggregated framework utilization and the performance of each dynamically constructed hardware system.

Once the data analysis methodology is in place using the mechanisms of the data heat map, workloads and/or disaggregated systems are then able to be classified into a number of classes, each optimized according to their method of data access and provided allowances unique to their access pattern. Below are described a few exemplary data access pattern classes.

Cache-Friendly—In this system, most data access can be met by the cache. In other words, workloads/systems exhibiting cache-friendly behavior are able to access most of their underlying data (i.e., beyond a certain threshold) in the cache of the processor(s). Cache-friendly workloads can afford to be executed on systems in which memory and storage resources are further away (physically, in relation to the processor(s) executing the workload) because these workloads will seldom experience storage and memory latency. In addition, the continuing trend of technology miniaturization provides a large range of CPU operating models and clock speeds which can be used to hide any performance impact of moving memory further away in systems with cache-friendly workloads.

Cache-Needy—This system's data access pattern exhibits behavior which suggests that it is not yet cache-friendly, but there is enough common data use that the system could be cache-friendly if the workload/system were provided additional (i.e., a larger) cache.

Memory-Friendly—In this system, the data access pattern exhibits behavior which does not suggest that the workload/system could be mostly satisfied through a large cache, however it is determined that most data access of this workload/system can be met by memory. These workloads can be advantaged by moving their underlying data to closer or faster memory mediums.

Storage-Friendly—Data access patterns from these systems exhibit behavior which suggests that these workloads/systems would not be mostly satisfied through a larger cache or by otherwise altering memory alignment in relation to the locality of the underlying data; however, these systems exhibit storage access patterns which when learned, can be used to pre-fetch forecasted data elements in the appropriate storage cache medium.

Once the data access analysis is performed, the optimization process (which will be discussed in detail, following) may be performed at any time (e.g., such as at predetermined intervals or triggered from system events). In some exemplary embodiments, however, the optimization may be triggered according to: (a) A predetermined interval given by the overall system administrator. This interval should be chosen in a manner which reflects how sensitive the system should be to the overhead of the performance optimization process; and/or (b) Special system triggers such as the initial allocation of a new dynamically constructed hardware system, hardware component failure, and/or any system alert of performance degradation or SLA violation (meaning the performance of the workload being performed is not adhering to its defined SLA).

Figures 6, 7A:
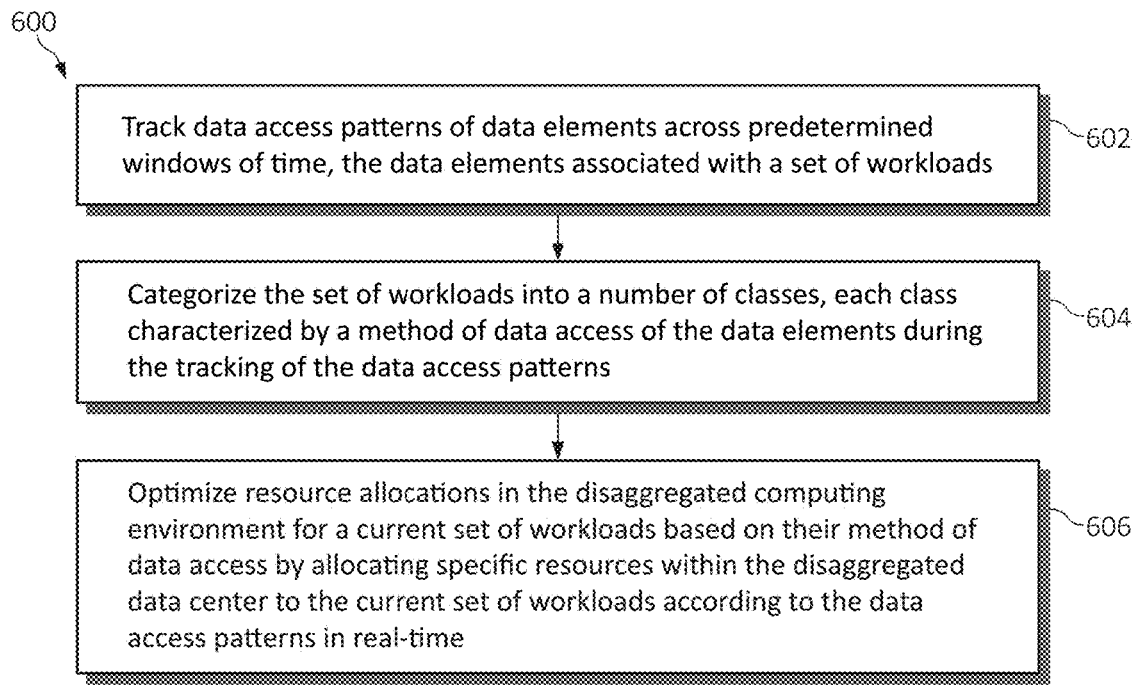
FIG. 6 is a flowchart diagram illustrating a method for optimizing dynamic resource allocations in a disaggregated computing environment, in accordance with various aspects of the present invention.
FIG. 7A is a block diagram depicting a spectrum of methods of data access, in accordance with various aspects of the present invention.

Generalizing these concepts, FIG. 6 illustrates a method 600 for optimizing dynamic resource allocations in a disaggregated computing environment. The method 600 (and all subsequent methods disclosed herein) may be performed in accordance with the present invention in any of the environments depicted in FIGS. 1-5, among others, in various embodiments. Of course, more or fewer operations than those specifically described in FIG. 6 may be included in the methods, as would be understood by one of skill in the art upon reading the present descriptions.

Each of the steps of the method 600 (and all subsequent methods disclosed herein) may be performed by any suitable component of the operating environment. For example, in various embodiments, the method 600 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a CPU, an Application Specific Integrated Circuit (ASIC), a Field Programmable Gate Array (FPGA), etc., combinations thereof, or any other suitable computing device known in the art.

The method 600 begins by tracking data access patterns of data elements across predetermined windows of time, where each of the data elements are associated with a set of workloads (step 602). At step 604, the set of workloads are categorized into at least one of a plurality of classes, each class characterized by a method of data access of the data elements during the tracking of the data access patterns. The method of data access may be considered to include whether the workloads primarily access (or otherwise are predicted to access) their data elements in cache, in memory, or in secondary storage resources. At step 606, resource allocations in the disaggregated computing environment for a current iteration of the set of workloads are optimized based on the method of data access by allocating specific resources within the disaggregated data center to the current iteration of the set of workloads according to the data access patterns. This allocation of the specific resources to the dynamically constructed disaggregated server is performed in real-time or substantially in real-time.

Accessing Data Access Patterns to Determine System/Workload Classification

In various embodiments disclosed herein, the data access patterns of the workloads executing in the disaggregated framework are monitored and modeled in order to determine where each workload lies in the spectrum of data access. FIG. 7A is a block diagram depicting a graph 700 of this spectrum of methods of data access. Graph 700 illustrates the relation between the frequency of data access to memory and storage resources and the cache-friendly, cache-needy, memory-friendly, and storage-friendly behaviors utilized to identify the data access patterns. Namely, as the frequency of tracked data access increases to (slower) larger memory and storage resources, the workloads associated with this data access exhibit the cache-friendly, cache-needy, memory-friendly, and storage-friendly behaviors, and are classified therein respectively.

This classification defines what techniques may be used to enable optimal cache, memory, and storage allocation to the disaggregated system. In some embodiments, a data heat map may be advantageously used to develop the data access tracking model, however, the data access modeling may take many forms also including data request monitoring, memory/storage link monitoring, etc. as one skilled in the art would appreciate.

Figures 7B, 8:
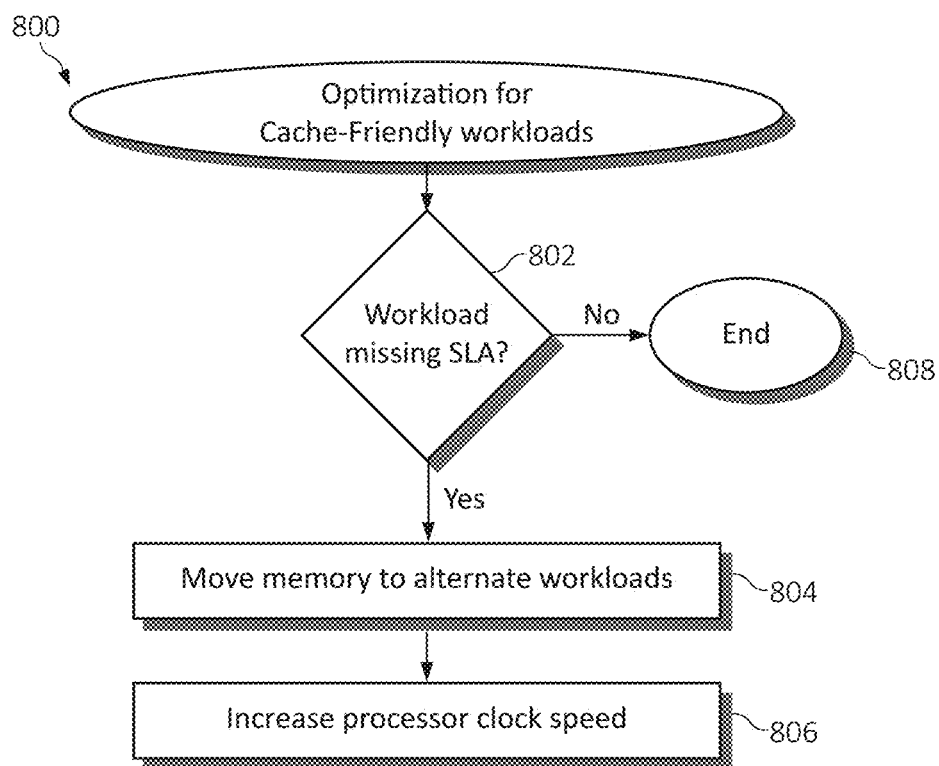
FIG. 7B is a block diagram depicting a data heat map, in accordance with various aspects of the present invention.
FIG. 8 is a flowchart diagram illustrating a method for optimizing dynamic resource allocations for cache-friendly workloads in a disaggregated computing environment, in accordance with various aspects of the present invention.

In some implementations, the data heat map may comprise a table of a respective workload's data scope and its most recent access pattern. Therefore, to build the data heat map 750 as depicted in FIG. 7B, as the workload accesses new data, an additional row is added to the table wherein the number of times this workload's data is accessed is tracked (i.e., as an integer value of a frequency of access). In this case, accessing new data is referring to a data element (like a variable), not the data's value (as the value for that data could change which would simply count as an additional access to that data). The location of the data is also updated in the data heat map 750 as it is accessed (e.g., within which tier of memory or storage, etc.); such that if a data element is accessed in memory and then subsequently moved to cache, there will not be two rows provided for the same data. Rather, one row would be provided with the latest access location information.

The data heat map 750 may use a sampling methodology (i.e., a sampling algorithm) to reduce overhead of comprehensive monitoring of each data element of the workload, such that the data heat map 750 is updated at certain intervals. Because patterns of frequent use are ultimately sought after for the data elements, these patterns should still show up with a given sampling of the overall data. Moreover, course data groups of the data elements may be used for each row of data access (such that several data elements are grouped into a course group). This may be a configurable parameter by a system administrator, etc. which will help operators balance the overhead with the effectiveness of the process of building the data heat map 750. Upon building and maintaining the data heat map 750, the classes of data access may then be determined for data elements or groups of data elements associated with respective workloads as follows.

Monitoring Cache-Friendliness: As mentioned, cache-friendly behavior is seen when a sufficient quantity and percentage of the data requests associated with a workload are fulfilled by the data in the processor caches (e.g., a quantity and/or percentage above a certain threshold). A cache-friendly classification may be determined by analyzing the data heat map 750 for a configurable number of intervals for sufficient count (above a predefined threshold) of data requests fulfilled by a particular cache identifier and a sufficient percentage (above a predefined threshold) of those data requests compared to the total data requests for the disaggregated system.

It should be noted that alternate means of approximating cache-friendly behavior may include using recent memory counters, memory link utilization, etc. to monitor the workload's access pattern to determine the quantity and relative percentage of data requests satisfied through the processor cache.

Monitoring Cache-Neediness: Cache-needy behavior is seen when the disaggregated system or workload's percentage of data requests fulfilled by the cache is too low to be considered cache-friendly, however the data access pattern of the workload shows frequent and reoccurring access to a limited set of data blocks outside of the processor cache. In this scenario, having access to a larger cache would enable this system or workload to become cache-friendly.

The detection of such cache-needy workloads may be detected in many ways, including examining the data heat map 750 for conditions where the majority of data requests can be fulfilled by an (feasibly) increased cache size. Allocating additional CPU resources to a target system (a target, dynamically constructed disaggregated server) will increase the target system's cache. Therefore, workloads exhibiting cache-needy behavior should be considered as workloads which could become cache-friendly if a small number of allocated CPU cache-sizes would aide in fulfillment of the workload's data request through the processor caches.

Monitoring Memory-Friendliness: Memory-friendly behavior is seen when data requests associated with the workload can be fulfilled mostly (e.g., beyond a certain threshold) within memory, however the memory will be accessed often. Workloads exhibiting this memory-friendly behavior may benefit from memory devices holding the workload data to be accessed being (physically) closer to the compute components.

Memory-friendly behavior of workloads may also be detected in many ways, including examining the data heat map 750 for conditions where a high number and high percentage (e.g., above a predefined threshold) of data requests of the workload were satisfied through memory access.

Monitoring Storage-Friendliness: Storage-friendly behavior is seen when data requests associated with the workload must be frequently fulfilled from storage devices, however the data requests are determined to be fulfilled in a manner which can be modeled. In this instance, sections of data in the storage devices may be identified which would benefit fulfillment of the workload's data requests if this data is temporarily moved to a faster medium in the memory/storage hierarchy.

Again, storage-friendly behavior of workloads may also be detected in many ways, including examining the data heat map 750 for conditions where a high number and high percentage of data requests (e.g., beyond a certain percentage threshold) have had to be satisfied through storage access. In addition to determining that the workload exhibits the storage-friendly behavior, the workload must meet one of the following predictability conditions: (a) Modeling accuracy—the workload must exhibit a storage access pattern which can be modeled and predicted with a high-level of accuracy. This ensures that the data selected has a high chance of being used in the faster storage medium; and/or (b) Small dataset—the workload's dataset must be small enough (as determined by a threshold, for example) that the whole dataset for the entire workload is able to be moved to the faster storage medium. In this case of determining the workload is associated with a small dataset, there is no need to predict the sections of data which would likely be used.

As eluded to previously, workloads themselves may be monitored to determine which class of access pattern they best fit into, however, the dynamically constructed disaggregated systems may also be allocated with resources built to serve a specific class previous to or subsequent to accepting such classes of workloads. In other words, "workloads" and "disaggregated systems" may be used somewhat interchangeably, as both the workloads requesting data and a given disaggregated system may each exhibit behavior pertaining to a certain class of data access. Of course, both the workloads and thereby the disaggregated systems performing the workloads may be allocated (or de-allocated) additional or fewer physical resources in substantially real time to account for the class of data access the workload/system ultimately fits into.

It should be noted that when a new disaggregated system allocation request is made (e.g., for performing a given workload), the workload/system is assumed to be cache-friendly unless configured otherwise by the system administrator/user. This is because cache-friendly systems tend to be the most relaxed (or flexible) of the classifications from a resource allocation point of view, as memory and storage resources may be allocated which are further away and in slower mediums than the processing component. This assumption permits flexibility in the overall framework to select convenient (physical) locations to allocate the system's memory and storage resources therefrom. If the assumption is correct, the disaggregated system will seldom experience any penalty of a larger distance to memory and storage resources located away from the processing component. If the assumption is incorrect and this causes SLA challenges of workloads being performed by the system, the new resource allocations will be quickly addressed in the overall optimization process or a system-specific optimization process (such as triggered by SLA violations, etc.).

Optimizing a Target System based on the Monitored System/Workload Classification In describing the optimization for each class of data access, the following global parameters are used and defined as:

Hop=A metric used to determine distance between components (e.g., the physical distance separating a processing component and a memory or storage component). This metric may comprise a number of time segments (e.g., 1 hop=1 nanosecond, etc.) or the metric may comprise a physical hop (i.e., a number of link segments between components);

Hop_window=A metric which determines how many "hops" should be considered as equivalent during each iteration of the optimization process;

CF_Threshold[x]=Predefined cache-friendliness thresholds which determine the aggressiveness of the cache-friendly re-allocation procedure for each hop x. These thresholds are defined by a system administrator;

CF_MemUnit[x][i]=A table containing the access pattern of memory unit i at hop x. This is a metric which will be compared to the CF_Threshold of hop x during the cache-friendly re-allocation procedure;

Clockspeed_maximum=A maximum percentage of normal clock speed able to be safely set for a given processing component (e.g., 1.10=10% overclocking); and Clockspeed_step=A unit amount of increased clock speed allowed during one optimization iteration to achieve better performance.

In some embodiments, to determine the disaggregated system target for local optimization, at least two optimization techniques may be performed. The first is what will be referred to as "general optimization". When the optimization process is run in a general optimization capacity (e.g., triggered at a predetermined interval input by the system administrator or triggered by a hardware failure, for example), a first disaggregated system attempts to identify all disaggregated systems within the framework in need of resources for performing various workloads, and optimizes the resource allocations to these systems. The optimization process may, again, be performed in a loop fashion at determined intervals, and a target disaggregated system will need to be determined for each pass of the optimization loop. The first targeted disaggregated system for optimizing may be determined by examining each disaggregated system in the highest service class (e.g., according to an SLA between the disaggregated system and a given tenant) to identify the system which is missing its SLA or otherwise is performing the most poorly. Once selected, the optimization process is executed for that target system, and once all systems in the highest service class are examined and optimized, the disaggregated systems belonging to the next highest service class are examined and optimized, and so on. This may be summarized as the current target=the disaggregated system having the poorest performance in its given service class.

The second optimization technique is referred to as a triggered optimization. In many situations, an event which triggers the optimization process will already be specific to a particular disaggregated system (the target system). In this case, the optimization is performed only for this target system and only one pass (one iteration) through the optimization process is needed to optimize only this system. For example, in an initial allocation example where a new disaggregated system is dynamically constructed and/or a disaggregated system has its resource allocations substantially changed, it is the new system having the new allocations thereto which is considered as the target for optimization. If a workload/system SLA violation is the trigger, the target system is the system whose SLA is violated. This may be summarized as the current target=the disaggregated system which triggered the optimization.

The following detailed cases are described in the context of the triggered optimization technique (such as a workload/system SLA violation). However, it should be appreciated that the optimization process may be performed as described above in the same manner (having the same steps described subsequently) using the general optimization technique as triggered by an administrator, as the disaggregated system having the poorest performance, or many other related triggering methods.

Cache-Friendly Workload Optimization

FIG. 8 is a flowchart diagram illustrating a method 800 for optimizing dynamic resource allocations for cache-friendly workloads in the disaggregated computing environment. In the case the target disaggregated system is cache-friendly (as observed from the workload's data access pattern) and this system/workload is determined to be missing (failing to meet) its SLA for a given workload (at step 802), optimization includes performing memory movement and increasing clock speed of the target system's processor(s) by a given step, as will be described. Otherwise, if the workload is not missing its SLA or the system is otherwise performing satisfactorily at step 802, the method 800 ends at step 808.

Returning to step 802, if the cache-friendly target system/workload is determined to fail to meet its SLA (or otherwise performing poorly), memory for these workloads can be de-allocated (moved) away to a further distance without hurting performance, allowing other workloads to allocate the closer memory to the system they are executing upon (step 804). Because the optimized workload exhibits cache-friendly behavior, increasing processor clock speed (at step 806) will increase the percentage of the time cache hits operate even faster. Further, overclocking the processer may help increase performance or mitigate any adverse effects of moving the memory further away.

This technique should also be used as part of the general optimization technique when cache-friendly workloads are missing predetermined goals, as well as a technique to reduce the already low impact of moving memory units of cache-friendly workloads to free up space for cache-un-friendly workloads. This process may be summarized as: if (target[Clockspeed]<Clockspeed_maximum) then target[Clockspeed]=target[Clockspeed]+Clockspeed_step.

Cache-Needy Workload Optimization

Figure 9:
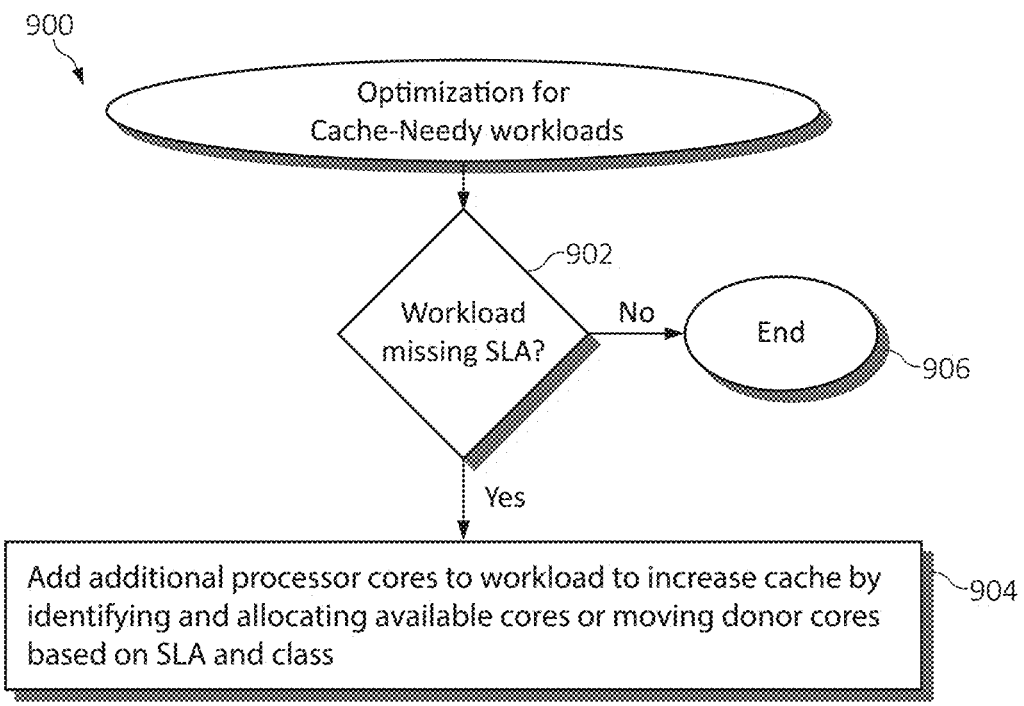
FIG. 9 is a flowchart diagram illustrating a method for optimizing dynamic resource allocations for cache-needy workloads in a disaggregated computing environment, in accordance with various aspects of the present invention.

FIG. 9 is a flowchart diagram illustrating a method 900 for optimizing dynamic resource allocations for cache-needy workloads in the disaggregated computing environment. In the case the target disaggregated system is cache-needy (as observed from the workload's data access pattern) and this system/workload is determined to be missing (failing to meet) its SLA for a given workload (at step 902), optimization includes allocating more processing cores to increase total amount of cache available to the target system, as will be described. Otherwise, if the workload is not missing its SLA or the system is otherwise performing satisfactorily at step 902, the method 900 ends at step 906.

Returning to step 902, if the cache-needy target system/workload is determined to fail to meet its SLA (or otherwise performing poorly), in order to increase the number of processing cores to the system, free cores must be identified or busy cores must be made available from lower importance systems or systems which exhibit cache un-friendly behavior on the same processor, and these cores are donated to the target system to increase cache volume thereof, as will be described (step 904). The following description illustrates the moving of a single processor core to the target system (to gradually impact performance), however an implementation may also include moving multiple cores to reach specific performance goals.

First, if there are available cores on this (same) processor of the target system which could be allocated to this processor to increase the amount of total cache available, an available core is allocated to this target system, and the process ends.

If there are not any available cores on this processor, various disaggregated systems utilizing the same processor are cycled through to identify a lower-class donor core (a system having allocated cores on the same processor as the target system), starting with the lowest priority workloads and ending with the workloads which are just one service class lower than the target system's service class. If a donor core is located, the following steps are followed: (a) The donor's core is moved to another processor. This is performed by (i) finding a free core such that if there are free cores in other processors, one of these cores is allocated to the donor system; (ii) copying cache data from the old core to the new core instantly allocated to the donor; and (iii) freeing the old core which the donor is donating to the target system. (b) The freed core is then allocated to the target workload of the target system.

If there are not any available cores or lower-service class disaggregated systems utilizing this processor, various disaggregated systems utilizing the same processor are cycled through to identify a processor in a system at the same service level as the target system to pick a cache-unfriendly donor which can afford to donate cache to the target system. In this instance, the following steps are performed:

(1) A donor core is identified in a system at the same service level, considering that (a) those donor cores are excluded who could violate their own SLA when donating. For example, the donor core cannot be within a predetermined percentage of violating its SLA (where the predetermined percentage may be set by the system administrator to determine the aggressiveness of the algorithm); (b) those donor cores who would violate reserved allocations if cores were donated are excluded; and (c) those donor cores chosen are ensured to be "cache-unfriendly enough". For example, even cache-unfriendly systems may suffer performance penalties when losing cache, and therefore only systems with components having cache-friendliness metrics which exceed a threshold designed for cache donation are considered. This threshold may also be set by the system administrator to determine the aggressiveness of the algorithm. This algorithm may be summarized as: Cache-Unfriendliness=% of data requests not met by the cache.

(2) If a donor is identified, another core is attempted to be identified to allocate (replace) the donor core of the donor system (of course, another core may not be able to be found to replace the donor core, however the donor core would not be considered if it were at risk of violating its system's SLA). If the donor core is allocated to the target system and another core is identified to replace the donor core of the donating system: (a) the donor's core is moved (allocated) to another processor by (i) finding a free core, wherein if free cores are identified in other processors, one of them is allocated to the donor system; and (ii) the cache data is copied from the free core to the replacement core just allocated to the donor system. (b) Subsequent to allocating the free core to the donor processor and copying the cache data thereof, the donor core (which the donor is donating to the target system) is freed and allocated to the target system/workload.

Memory-Friendly Workload Optimization

Figure 10A:
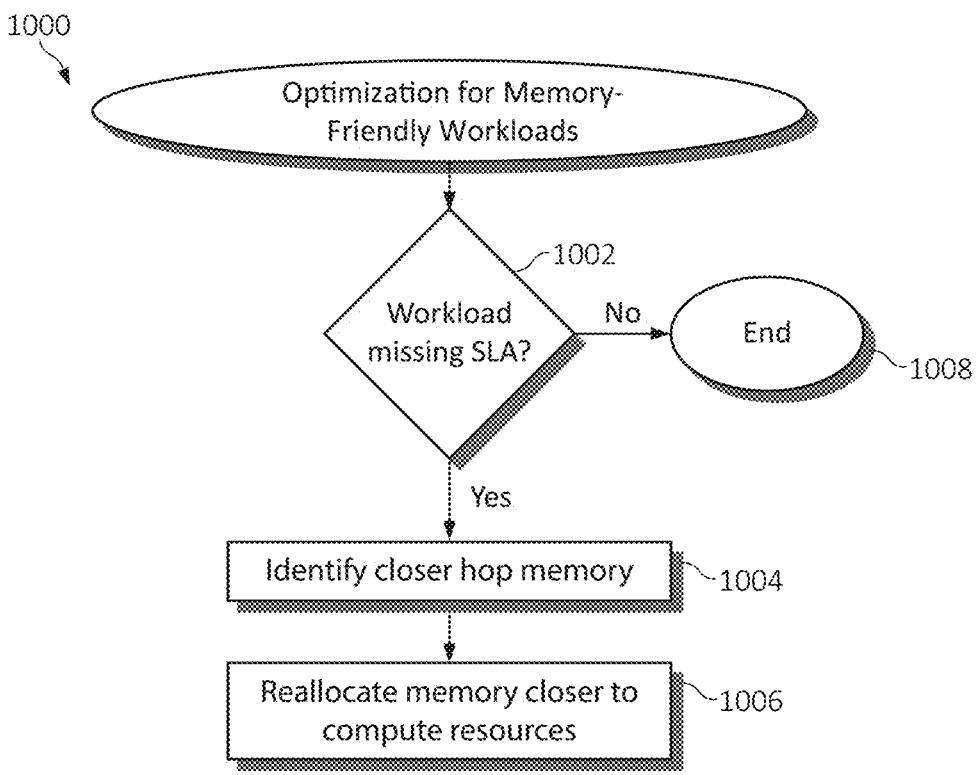
FIG. 10A is a flowchart diagram illustrating a method for optimizing dynamic resource allocations for memory-friendly workloads in a disaggregated computing environment, in accordance with various aspects of the present invention.

FIG. 10A is a flowchart diagram illustrating a method 1000 for optimizing dynamic resource allocations for memory-friendly workloads in the disaggregated computing environment. In the case the target disaggregated system is memory-friendly (as observed from the workload's data access pattern) and this system/workload is determined to be missing (failing to meet) its SLA for a given workload (at step 1002), optimization includes attempting to find and allocate closer hop memory to the target system, as will be described. Otherwise, if the workload is not missing its SLA or the system is otherwise performing satisfactorily at step 1002, the method 1000 ends at step 1008.

Figure 10B:
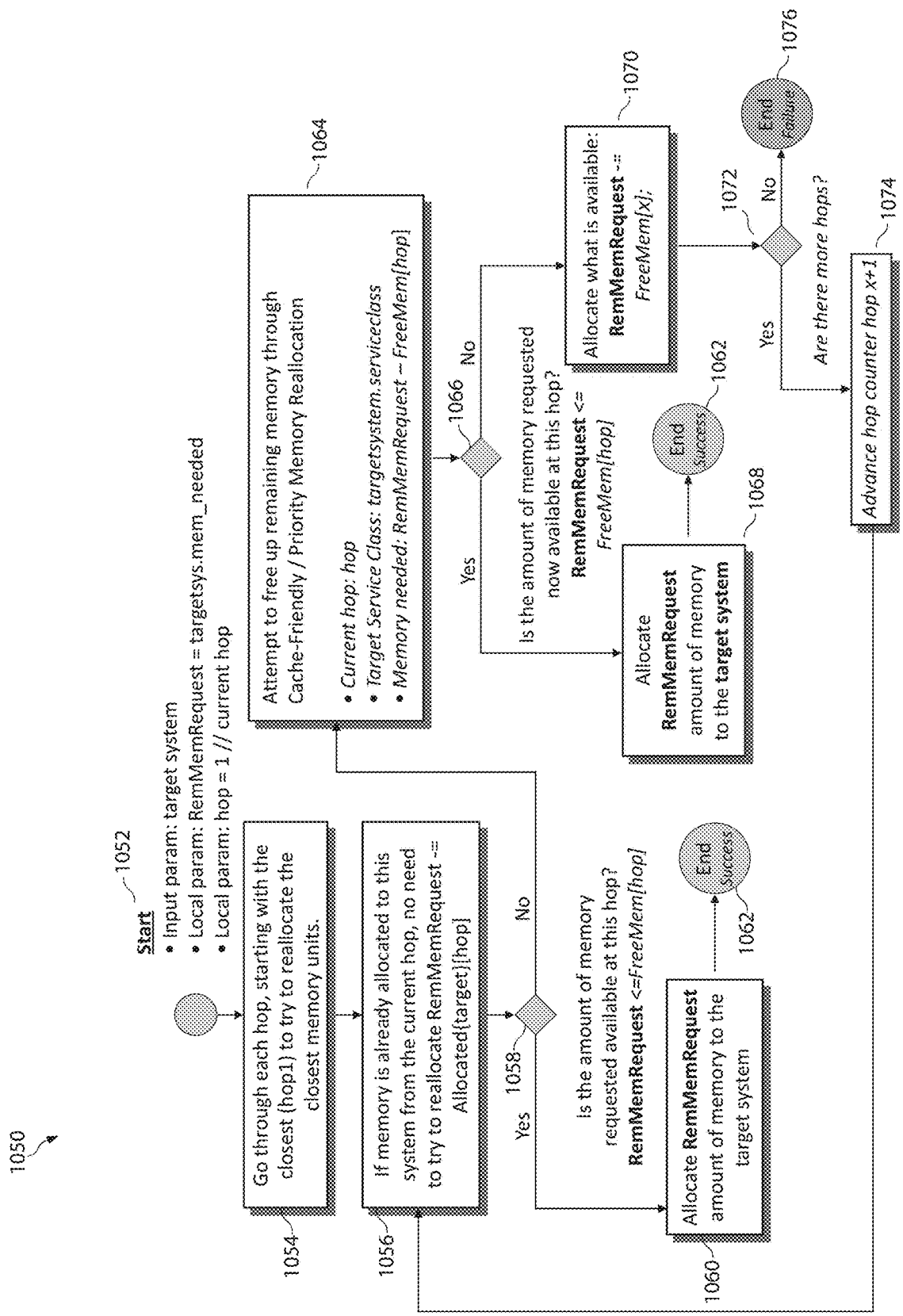
FIG. 10B is an additional flowchart diagram illustrating a method for optimizing dynamic resource allocations for memory-friendly workloads in a disaggregated computing environment, in accordance with various aspects of the present invention.

Returning to step 1002, if the memory-friendly target system/workload is determined to fail to meet its SLA (or otherwise performing poorly), the amount of the target system's memory that is furthest away is determined, closer hop memory to the target system's processing component is then identified (step 1004), and the memory determined to be furthest away from the target system is then targeted for reallocation to the hop memory closer to the processing component (step 1006). The following description illustrates this memory reallocation in accordance with the method 1050 for optimizing memory placement in FIG. 10B.

The method 1050 begins (step 1052) by determining the amount of the target system's memory that is furthest away, and iterating through each hop to determine the closest memory unit(s) to reallocate this system's memory thereto (step 1054). If the target system is an initial request (i.e., the system did not exist prior), RemMemRequest is used as the representation of the actual amount of memory requested. Conversely, if the target system is an existing system, RemMemRequest is represented as the amount of memory further than 1 Hop_window away. Additionally, assume that hop x starts at 1 (1 Hop_window).

It should be noted that if memory is already allocated to this target system from the current hop, there is no need to attempt to reallocate the RemMemRequest (such that RemMemRequest-=Allocated {target}[hop]) (step 1056). Next, using these described variables, a determination is made (step 1058) as to whether the memory request can be totally fulfilled with free memory within hop x (RemMemRequest<=FreeMem[hop]). If the requested amount of memory is available at the determined hop, these memory units (referenced as RemMemRequest) are allocated to the target system (step 1060) and the method 1050 ends successfully (step 1062).

Returning to step 1058, if the memory request cannot be totally fulfilled with free memory at hop x (RemMemRequest>FreeMem[x]), a cache-friendly and priority reallocation procedure is performed (referred to as the "special method" described infra) at hop x to free up hop x memory (step 1064). Subsequent to performing the cache-friendly and priority reallocation procedure, a determination is made (step 1066) as to whether the memory request can then be totally fulfilled with free memory at hop x (RemMemRequest<=FreeMem[hop]). If the memory request can then be fulfilled at step 1066, the memory units are reallocated to the target system at step 1068, and the method 1050 again ends successfully (step 1062).

Returning to step 1066, if even subsequent to the cache-friendly reallocation procedure, the memory request still cannot be totally fulfilled with free memory at hop x (RemMemRequest>FreeMem[x]), the available free memory allocated at hop x (FreeMem[x]) is reallocated to the workload (step 1070), and RemMemRequest is updated to show the actual amount of memory resources requested pursuant to this reallocation (RemMemRequest=RemMemRequest-FreeMem[x]). A determination is then made (step 1072) as to whether this hop is the last hop (the hop closest to the target system or hop=MAX). If no additional hops exist to examine, the method 1050 ends as a failed attempt (step 1076). Otherwise, if additional hops exist to be examined at step 1072, the hop counter is advanced to x+1 (step 1074), and the method 1050 returns to step 1056, where if there is already memory allocated to the target system at this new hop, there inherently is no need to reallocate this memory to the target system as (RemMemRequest=RemMemRequest-Allocated [target][x]). The reallocation process is then restarted anew where available free memory at hop x is reallocated to the workload, and RemMemRequest is updated to distinguish the available resources requested/utilized.

Storage-Friendly Workload Optimization

Figure 11:
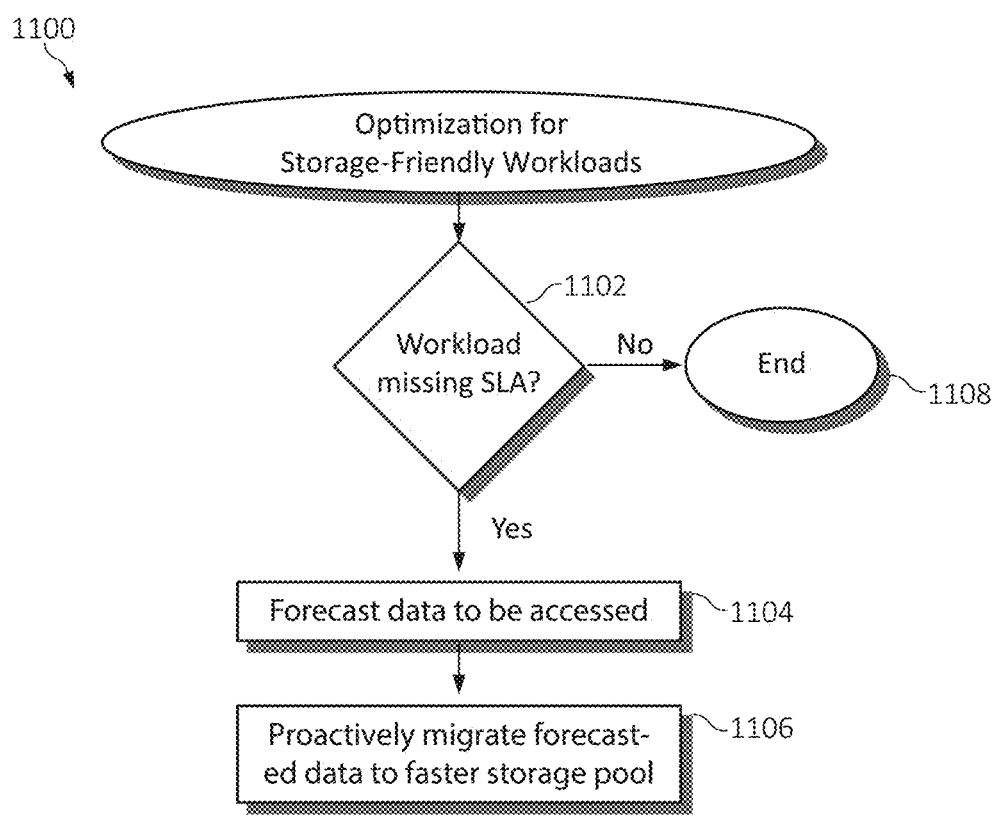
FIG. 11 is a flowchart diagram illustrating a method for optimizing dynamic resource allocations for storage-friendly workloads in a disaggregated computing environment, in accordance with various aspects of the present invention.

FIG. 11 is a flowchart diagram illustrating a method 1100 for optimizing dynamic resource allocations for storage-friendly workloads in the disaggregated computing environment. In the case the target disaggregated system is storage-friendly (as observed from the workload's data access pattern) and this system/workload is determined to be missing (failing to meet) its SLA for a given workload (at step 1102), optimization includes temporarily allocating a faster portion of the storage/memory spectrum (this could be seen as a dynamic storage cache) to the blocks of data which are forecasted to be accessed for the next x number of time intervals (as predicted by analysis of the data heat map 750), as will be described. Otherwise, if the workload is not missing its SLA or the system is otherwise performing satisfactorily at step 1102, the method 1100 ends at step 1108.

Returning to step 1102, if the storage-friendly target system/workload is determined to fail to meet its SLA (or otherwise performing poorly), data or portions of a dataset (associated with the workload) which will be accessed is predicted or forecasted (step 1104), and this data is proactively moved to a faster storage medium for performance improvements when the data is subsequently accessed (step 1106). As mentioned, these blocks of data are forecasted to be accessed for the next x number of time intervals, where the number of intervals which will be taken into account "x" can be dependent on the confidence of the model and the aggressiveness setting of the system.

In the disaggregated framework, there are several pools of various types of storage devices (e.g., PCM, Flash, HDD, etc.) which may be categorized by their speed—store[1 . . . n] where store[1] is the fastest (e.g., PCM storage) and store[n] is the slowest (e.g., tape storage). Therefore, in the case of observed storage-friendly workloads, one of the faster storage mediums is attempted to be leveraged as cache for the target system to lessen the impact of the system's frequent storage access by performing the following steps. First, the most frequently accessed data groups (cache_set) are determined and forecasted for the target system's next "x" intervals. Next, considering that RemStoreRequest=size (cache_set), for each data element/data group in the forecasted cache_set (starting with the cache_set data elements which are the furthest away from the target system), a determination is made as to whether a faster storage medium exists which could be used as a cache for the target system as follows:

(1) When the determination is made that a faster storage medium exists, another determination is made as to whether there exists free storage space in this storage medium, and if free space exists, this is represented as (FreeStore[storeID]) in a storeID<current_data_element.storeID, where storeID references the storage identification (ID) of the faster medium; and (2) If it is determined that there exists no free storage space, in a storeID<current_data_element.storeID, other storage caches from less important (lower priority) workloads may be written back to this storage and removed to free space for this workload's (the higher priority/target system's) storage cache.

Once the determination is made that a faster storage medium exists and free storage space exists in this medium, any faster storage identified above can be allocated as additional storage to the target system, however the target system will use it as a write-back cache for the current data element (current_data_element). It should be noted that point-to-point connections (inherent in the disaggregated framework) can be made between the storage at storeID (the cache destination) and current_data_element.storeID (the current location) to enable quick copying of the data therein. Further, at the end of "x" intervals, the dirty data may be written back to the current_data_element through a point-to-point connection and the storage cache may be removed. Additionally and/or alternatively, the storage cache may be refreshed by leveraging the forecast for the next "x" time intervals by use of the data heat map 750.

Special Method: Cache-Friendly and Priority Reallocation

Figure 12:
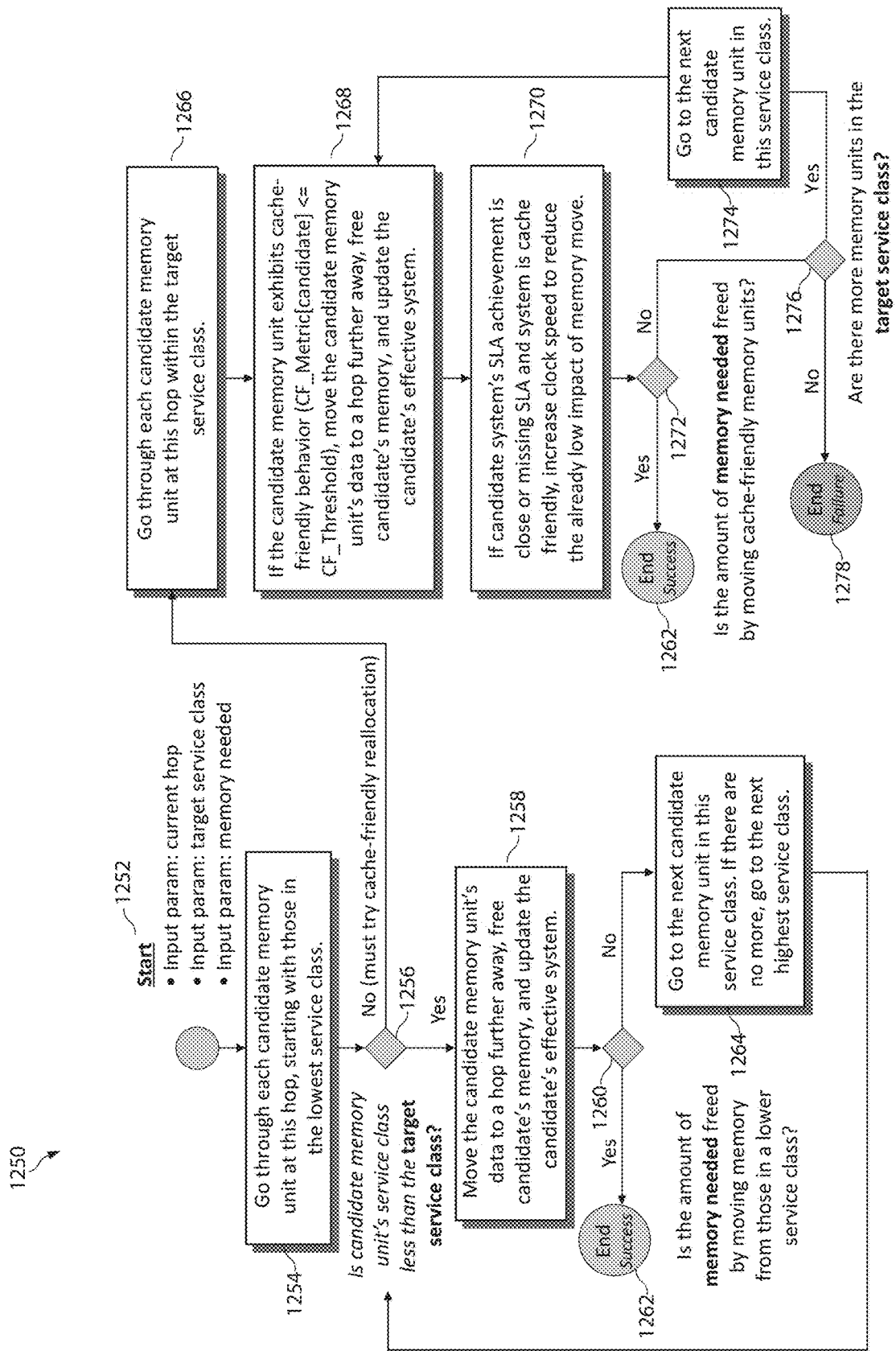
FIG. 12 is a flowchart diagram illustrating a method for optimizing dynamic resource allocations through cache-friendly and priority memory reallocation in a disaggregated computing environment, in accordance with various aspects of the present invention.

As mentioned previously, to free up memory at a particular hop (hop x), a priority reallocation procedure may be performed so as to free memory for allocation during the memory-friendly optimization procedure as described. As illustrated by the method 1250 in FIG. 12, this special reallocation procedure begins (step 1252) by reading the configuration parameter CF_Threshold[x] to determine the aggressiveness of this particular cache-friendly reallocation procedure at hop x, and examining, for each dynamic hardware system memory unit (i) in hop x, the service class (serviceclass(i)) related to this candidate memory (step 1254). Those memory units in the lowest service class are first examined.

Next, a determination is made (step 1256) as to whether the service class of the identified candidate memory units is less than (a lower priority than) the service class of the target system. If the candidate memory is determined to be assigned to a lower priority class (if (serviceclass(i)<serviceclass(target)), the candidate memory units are moved to a hop further away (in physical distance) by identifying free memory unit(s) j in a subsequent hop z (z is greater than x) are less important (have a lower priority) than workload memory unit j in hop z. Data is then copied from memory unit i in hop x to newly freed memory units j in hop z, and the candidate's effective system is updated to show the new amount of memory assigned to the system by updating the processor link to memory to point to the new memory unit j in hop z. Finally, the memory unit i in hop x is freed to make it available for the target workloads of the target system (represented as memory_needed=memory_needed−memoryunit(i)) (step 1258).

Subsequent to moving the candidate memory and freeing the memory units to be allocated to the target system, a memory unit counter i is incremented (i=i+1), and a determination is made (step 1260) as to whether the amount of memory needed by the target system has been freed by the first iteration of the method 1250. If the memory request requirement has been satisfied, the method 1250 ends successfully (step 1262). Otherwise, a next candidate memory unit in the same service class is examined, or, if no additional memory units exist in this service class, memory units allocated to a next highest service class are then examined (step 1264). This process is repeated until memory_needed<=0 or all memory units i in hop x have been exhausted (by returning to step 1256).

Returning to step 1256, if the candidate memory unit's service class is higher than the target system's service class, the method 1250 advances to again iterating through each candidate memory unit at the given hop within the target system's service class (step 1266). Next, if the candidate memory unit exhibits cache-friendly behavior (CF_Metric [candidate]<=CF_Threshold), the candidate memory unit's data is moved to a hop further away (in distance). That is, for each dynamic hardware system memory unit (i) in hop x, the (CF_MemUnit[x][i]) is examined, and if (CF_MemUnit[x]

[i]<=CF_Threshold[x]), this memory unit is considered cache-friendly and can be moved. This is performed by identifying free memory unit j in hop z or less important workload memory units j in hop z, as previous. Data is then copied from memory unit i in hop x to newly freed memory unit j in hop z, and the candidate's effective system is updated to show the new amount of memory assigned to the system by updating the processor link to memory to point to the new memory unit j in hop z. Finally, the memory unit i in hop x is freed to make it available for the target workloads of the target system (represented as memory_needed=memory_needed−memoryunit(i)) (step 1268).

Subsequent to moving the candidate memory and freeing the memory units to be allocated to the target system, the memory unit counter i is incremented (i=i+1), and if the candidate system's SLA production is close to or missing its SLA requirement and the system is considered to be cache-friendly, the processor clock speed is increased to reduce the already low impact of the previous memory reallocation (step 1270). The method 1250 then determines whether the amount of memory needed has been freed by moving the cache-friendly memory units (step 1272), and if so, the method 1250 ends successfully (step 1262). If the amount of memory requested has not been freed at step 1272, a determination is then made (step 1276) as to whether additional memory units exist in the target system's service class. If no additional memory units exist in the target system's service class, the method ends unsuccessfully (step 1278). Otherwise, the next candidate memory unit in the target system's service class is examined (step 1274), and the method 1250 returns to determining whether this memory unit exhibits cache-friendly behavior and may be reallocated at step 1268.

The present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for optimizing dynamic resource allocations in a disaggregated computing environment, by a processor device, comprising:
    tracking data access patterns of data elements across predetermined windows of time, the data elements used in execution of a set of workloads, wherein the tracked data access patterns are assembled into a heat map, the heat map including information on a workload data scope and a most recent access pattern including a most recent access location of the data elements;
    categorizing the set of workloads into at least one of a plurality of classes, each class characterized by a method of data access of the data elements during the tracking of the data access patterns, wherein the data access patterns recorded in the heat map include an indication of a percentage and quantity of data requests of the data elements were fulfilled by each of a plurality of specific individual hardware resources, and wherein the heat map includes additional information of a cost per bit versus a locality of the data elements, as determined by the most recent access location, relative to respective others of the specific individual hardware resources that execute the set of workloads; and
    optimizing resource allocations in the disaggregated computing environment for a current iteration of the set of workloads based on the information and the additional information in the heat map by allocating at least a portion of the specific individual hardware resources, each selected from respective pools of the hardware resources within the disaggregated computing environment, to the current iteration of the set of workloads according to the data access patterns in real-time; wherein the specific individual hardware resources each contribute only a portion of processing of the current iteration of the set of workloads notwithstanding each of the specific individual hardware resources are assigned to a single dynamically composed computing node executing the current iteration of the set of workloads irrespective of a physical location of the pools to which the specific individual hardware resources reside.

2. The method of claim 1, wherein the optimizing further comprises optimizing a balance between an overall disaggregated framework utilization and a performance of each dynamically constructed hardware system within the disaggregated computing environment.

3. The method of claim 2, further including categorizing a set of the dynamically constructed hardware systems into the at least one of the plurality of classes by allocating the specific individual hardware resources associated with respective ones of the classes to each respective dynamically constructed hardware system.

4. The method of claim 1, wherein the plurality of classes include:
    a cache-friendly class wherein the data elements exhibit data access patterns of having cache hits over a certain threshold;
    a cache-needy class wherein the data elements exhibit data access patterns determined to become cache-friendly when additional cache is allocated;
    a memory-friendly class wherein the data elements exhibit data access patterns determined to be best satisfied with memory resources; and
    a storage-friendly class wherein the data elements exhibit data access patterns determined to be best satisfied using pre-fetched data in an appropriate storage medium.

5. The method of claim 1, further including updating the heat map according to a sampling algorithm of a sampling of the tracked data access patterns, the sampling algorithm set as a parameter configurable by a system administrator.

6. The method of claim 5, further including performing the optimization at predetermined intervals assigned by the system administrator or in response to detecting one of a set of special system triggers.

7. The method of claim 6, wherein the set of special system triggers are selected from a group consisting of an initial allocation of a new dynamic hardware system, a hardware component failure, a system alert of performance degradation, and a Service Level Agreement (SLA) violation.

8. A system for optimizing dynamic resource allocations in a disaggregated computing environment, the system comprising:
    a processor device executing instructions stored in a memory device, wherein the processor device:
        tracks data access patterns of data elements across predetermined windows of time, the data elements used in execution of a set of workloads, wherein the tracked data access patterns are assembled into a heat map, the heat map including information on a workload data scope and a most recent access pattern including a most recent access location of the data elements;
        categorizes the set of workloads into at least one of a plurality of classes, each class characterized by a method of data access of the data elements during the tracking of the data access patterns, wherein the data access patterns recorded in the heat map include an indication of a percentage and quantity of data requests of the data elements were fulfilled by each of a plurality of specific individual hardware resources, and wherein the heat map includes additional information of a cost per bit versus a locality of the data elements, as determined by the most recent access location, relative to respective others of the specific individual hardware resources that execute the set of workloads; and optimizes resource allocations in the disaggregated computing environment for a current iteration of the set of workloads based on the information and the additional information in the heat map by allocating at least a portion of the specific individual hardware resources, each selected from respective pools of the hardware resources within the disaggregated computing environment, to the current iteration of the set of workloads according to the data access patterns in real-time; wherein the specific individual hardware resources each contribute only a portion of processing of the current iteration of the set of workloads notwithstanding each of the specific individual hardware resources are assigned to a single dynamically composed computing node executing the current iteration of the set of workloads irrespective of a physical location of the pools to which the specific individual hardware resources reside.

9. The system of claim 8, wherein the optimizing further comprises optimizing a balance between an overall disaggregated framework utilization and a performance of each dynamically constructed hardware system within the disaggregated computing environment.

10. The system of claim 9, wherein the processor device categorizes a set of the dynamically constructed hardware systems into the at least one of the plurality of classes by allocating the specific individual hardware resources associated with respective ones of the classes to each respective dynamically constructed hardware system.

11. The system of claim 8, wherein the plurality of classes include:
a cache-friendly class wherein the data elements exhibit data access patterns of having cache hits over a certain threshold;
a cache-needy class wherein the data elements exhibit data access patterns determined to become cache-friendly when additional cache is allocated;
a memory-friendly class wherein the data elements exhibit data access patterns determined to be best satisfied with memory resources; and
a storage-friendly class wherein the data elements exhibit data access patterns determined to be best satisfied using pre-fetched data in an appropriate storage medium.

12. The system of claim 8, wherein the processor device updates the heat map according to a sampling algorithm of a sampling of the tracked data access patterns, the sampling algorithm set as a parameter configurable by a system administrator.

13. The system of claim 12, wherein the processor device performs the optimization at predetermined intervals assigned by the system administrator or in response to detecting one of a set of special system triggers.

14. The system of claim 13, wherein the set of special system triggers are selected from a group consisting of an initial allocation of a new dynamic hardware system, a hardware component failure, a system alert of performance degradation, and a Service Level Agreement (SLA) violation.

15. A computer program product for optimizing dynamic resource allocations in a disaggregated computing environment, by a processor device, the computer program product embodied on a non-transitory computer-readable storage medium having computer-readable program code portions stored therein, the computer-readable program code portions comprising:

an executable portion that tracks data access patterns of data elements across predetermined windows of time, the data elements used in execution of a set of workloads, wherein the tracked data access patterns are assembled into a heat map, the heat map including information on a workload data scope and a most recent access pattern including a most recent access location of the data elements;

an executable portion that categorizes the set of workloads into at least one of a plurality of classes, each class characterized by a method of data access of the data elements during the tracking of the data access patterns, wherein the data access patterns recorded in the heat map include an indication of a percentage and quantity of data requests of the data elements were fulfilled by each of a plurality of specific individual hardware resources, and wherein the heat map includes additional information of a cost per bit versus a locality of the data elements, as determined by the most recent access location, relative to respective others of the specific individual hardware resources that execute the set of workloads; and an executable portion that optimizes resource allocations in the disaggregated computing environment for a current iteration of the set of workloads based on the information and the additional information in the heat map by allocating at least a portion of the specific individual hardware resources, each selected from respective pools of the hardware resources within the disaggregated computing environment, to the current iteration of the set of workloads according to the data access patterns in real-time; wherein the specific individual hardware resources each contribute only a portion of processing of the current iteration of the set of workloads notwithstanding each of the specific individual hardware resources are assigned to a single dynamically composed computing node executing the current iteration of the set of workloads irrespective of a physical location of the pools to which the specific individual hardware resources reside.

16. The computer program product of claim 15, wherein the optimizing further comprises optimizing a balance between an overall disaggregated framework utilization and a performance of each dynamically constructed hardware system within the disaggregated computing environment.

17. The computer program product of claim 16, further including an executable portion that categorizes a set of the dynamically constructed hardware systems into the at least one of the plurality of classes by allocating the specific individual hardware resources associated with respective ones of the classes to each respective dynamically constructed hardware system.

18. The computer program product of claim 15, wherein the plurality of classes include:
a cache-friendly class wherein the data elements exhibit data access patterns of having cache hits over a certain threshold;
a cache-needy class wherein the data elements exhibit data access patterns determined to become cache-friendly when additional cache is allocated;
a memory-friendly class wherein the data elements exhibit data access patterns determined to be best satisfied with memory resources; and a storage-friendly class wherein the data elements exhibit data access patterns determined to be best satisfied using pre-fetched data in an appropriate storage medium.

19. The computer program product of claim 15, further including an executable portion that updates the heat map according to a sampling algorithm of a sampling of the tracked data access patterns, the sampling algorithm set as a parameter configurable by a system administrator.

20. The computer program product of claim 19, further including an executable portion that performs the optimization at predetermined intervals assigned by the system administrator or in response to detecting one of a set of special system triggers.

21. The computer program product of claim 20, wherein the set of special system triggers are selected from a group consisting of an initial allocation of a new dynamic hardware system, a hardware component failure, a system alert of performance degradation, and a Service Level Agreement (SLA) violation.

* * * * *